May 30, 1944.  E. S. GANDRUD  2,350,107
SPREADER FOR FERTILIZER, SEEDS, AND THE LIKE
Filed July 13, 1942  3 Sheets-Sheet 1
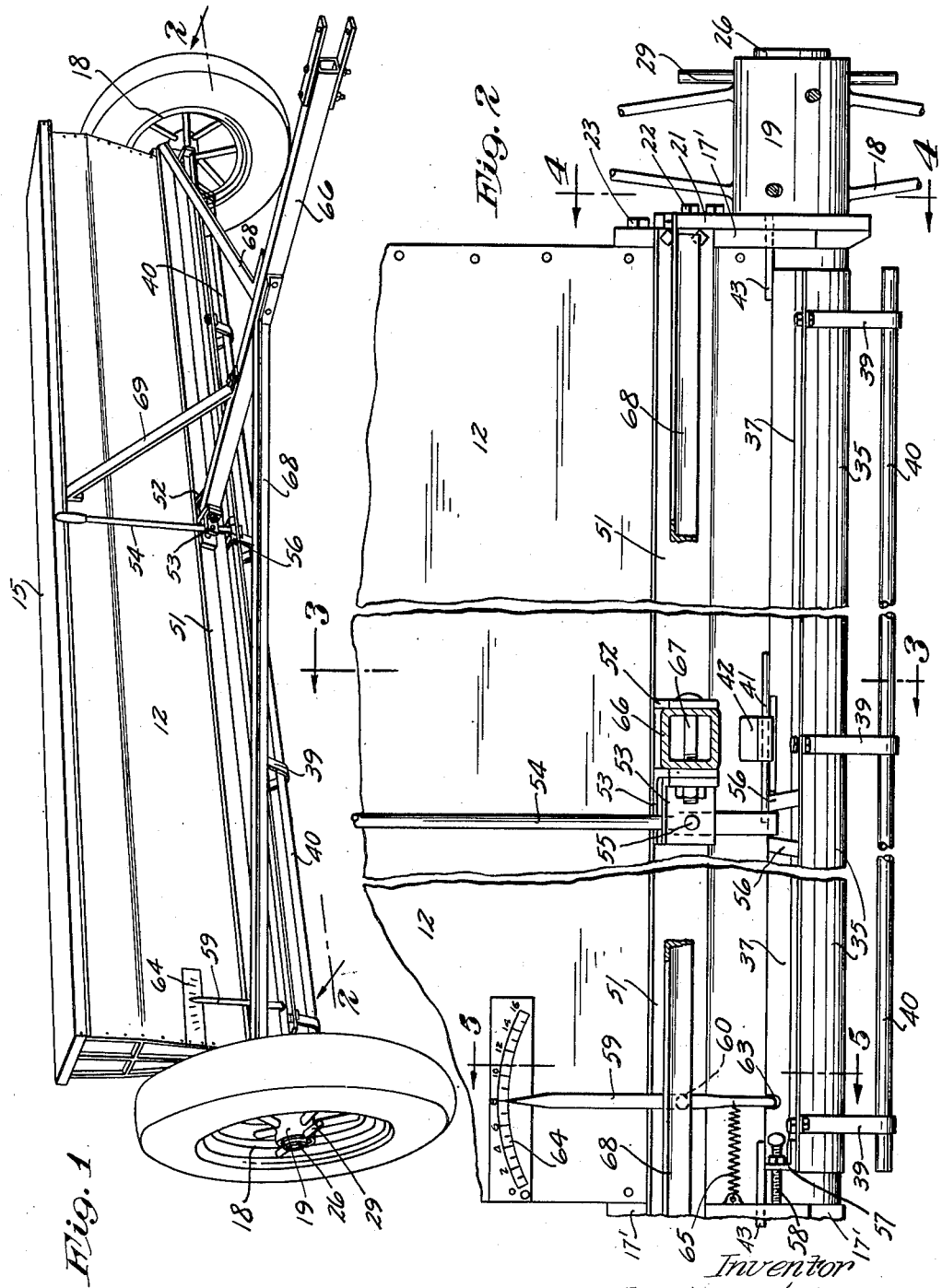
Inventor
Ebenhard S. Gandrud
By his Attorneys May 30, 1944.  E. S. GANDRUD  2,350,107
SPREADER FOR FERTILIZER, SEEDS, AND THE LIKE
Filed July 13, 1942  3 Sheets-Sheet 2
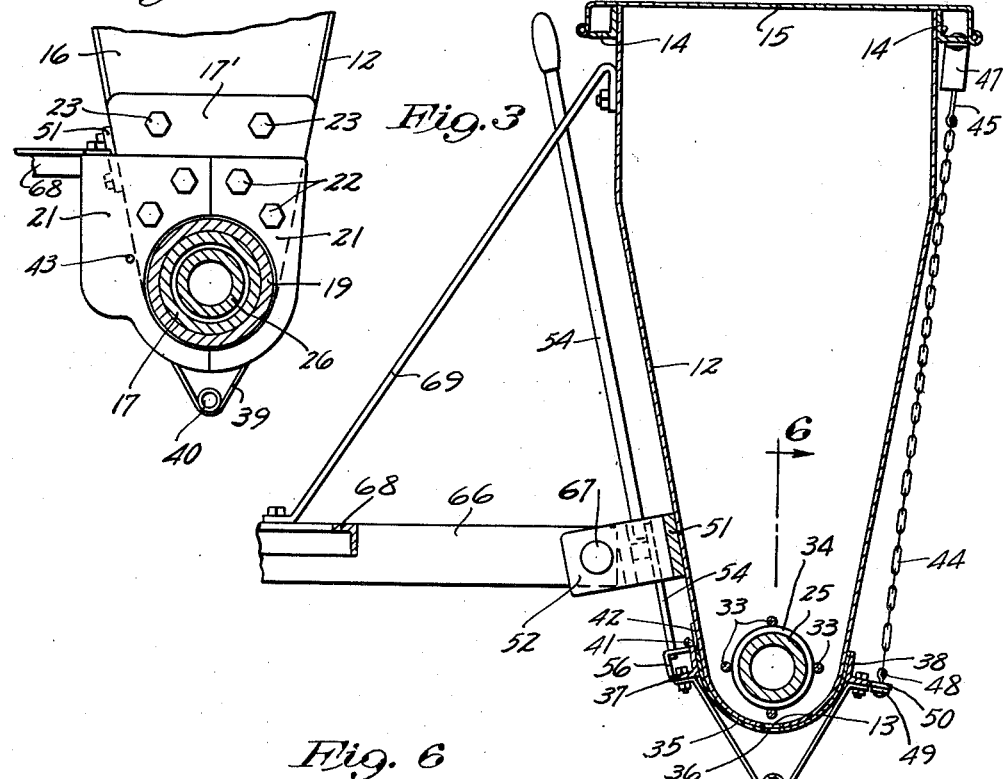
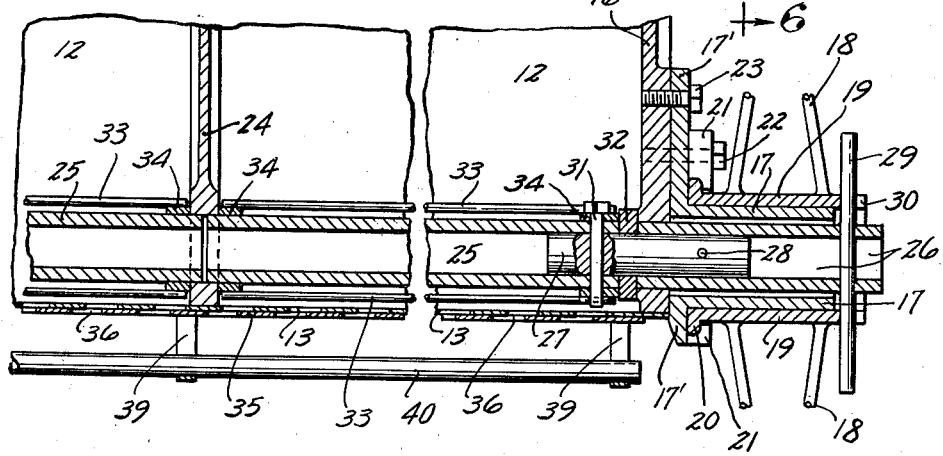
Inventor
Ebenhard S. Gandrud
By his Attorneys

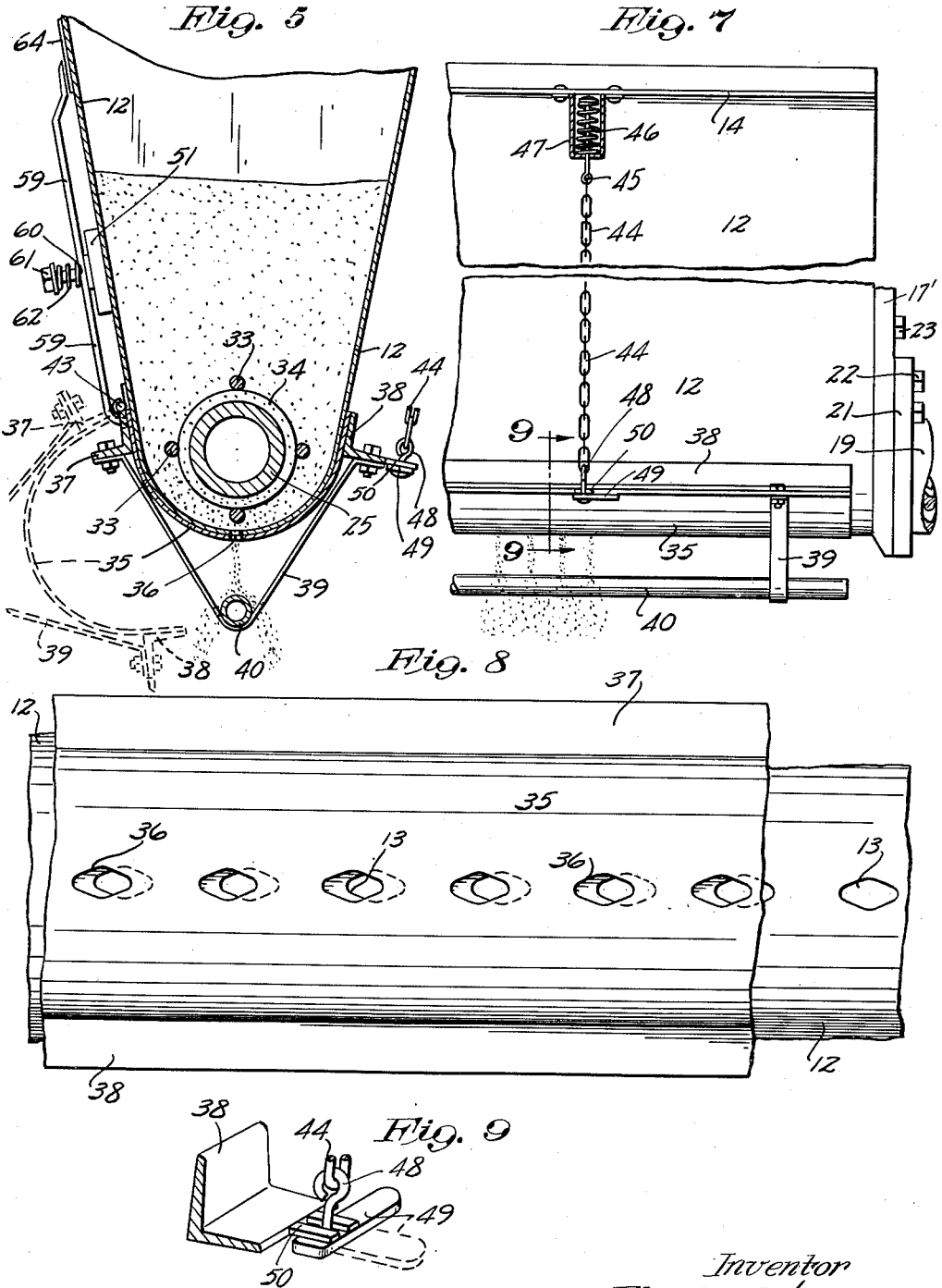
May 30, 1944.  E. S. GANDRUD  2,350,107
SPREADER FOR FERTILIZER, SEEDS, AND THE LIKE
Filed July 13, 1942  3 Sheets-Sheet 3
Inventor
Ebenhard S. Gandrud
By his Attorneys Patented May 30, 1944

2,350,107

UNITED STATES PATENT OFFICE 2,350,107

SPREADER FOR FERTILIZER, SEEDS, AND THE LIKE

Ebenhard S. Gandrud, Owatonna, Minn.

Application July 13, 1942, Serial No. 450,648

8 Claims. (Cl. 275—2)

My present invention provides a simple and highly efficient machine for broadcasting and evenly distributing dry granular fertilizer, seeds, and the like. Broadly stated, the machine is designed for and adapted to evenly spread and distribuate any and all kinds of granular materials that will flow under the action of gravity when agitated or kept in loose condition. The spreader is adapted to spread the materials evenly over wide swaths, under advance movement of the spreader.

The spreader or machine involves a hopper or receptacle in which is a rotary agitator of novel construction and arrangement. The spreader is mounted on wheels laterally offset in axial alignment, the one with the other, and with the axis of the agitator. As an important feature, the agitator is made in two sections, the one section being driven from one of the wheels, and the other from the opposite wheel.

The hopper is provided with a concave approximately semi-cylindrical bottom formed with discharge passages of novel form and arrangement; and a valve-acting gate, in the form of a concave plate that fits the concave bottom of the hopper, is arranged to slide axially thereof. This gate is provided with discharge passages of the same novel form and arrangement as those provided in the bottom of the hopper. The valve-acting gate or plate is displaceably mounted in a novel way and for an important purpose which will hereinafter appear.

All of the above noted and various other novel features will be more fully described in connection with the accompanying drawings which illustrate a commercial machine embodying my invention.

Referring to the drawings, wherein like characters indicate like parts throughout the several views:

Fig. 1 is a view in perspective showing the improved spreader looking at the same from the front toward the rear;

Fig. 2 is a vertical section taken approximately on the line 2—2 of Fig. 1, some parts being broken away;

Fig. 3 is a vertical front to rear section taken on the line 3—3 of Fig. 2;

Fig. 4 is a vertical section taken on the line 4—4 of Fig. 2, some parts being broken away;

Fig. 5 is a vertical section taken on the line 5—5 of Fig. 2;

Fig. 6 is a fragmentary view taken in section on the line 6—6 of Fig. 3;

Fig. 7 is a side elevation of the parts shown in Fig. 5 looking at the same from the right toward the left;

Fig. 8 is a bottom plan view showing a portion of the hopper and valve-acting gate, parts of each thereof being broken away; and Fig. 9 is a fragmentary view in perspective, some parts being sectioned on the line 9—9 of Fig. 7.

The hopper 12 is preferably a sheet metal structure and is formed with the concave or approximately semi-cylindrical bottom provided with longitudinally spaced diamond-shaped discharge passages 13. At its top the hopper is shown as reinforced by angle irons 14, and is provided with a removable or displaceable cover 15.

At the lower portion of its opposite sides or ends, the hopper 12 has rigidly secured bearing plates 16 to which are rigidly secured tubular wheel-supporting trunnions 17. These trunnions 17 have plate-like flanges 17' directly and rigidly secured to the lower end portions of the hopper 12.

As above indicated, the spreader is mounted on a pair of axially spaced wheels. These wheels 18 may be of any suitable form but, as shown, are provided with hubs 19 journaled on the respective trunnions 17 and provided at their inner ends with outstanding flanges 20 engaged by divided retaining plates 21 that permit free rotation of the wheels but hold the same against axial displacement from their respective trunnions. As best shown in Figs. 4 and 6, the retaining plates 21 are detachably secured to the flanges 17' of the trunnions 17 by machine screws 22, and the flanges of said trunnions are detachably secured to the bearing plates 16 by machine screws 23.

At its transversely central portion the hopper 12 is provided with a partition plate 24 that divides the hopper, or at least the lower portion thereof, into two compartments. Agitator shafts 25, that are preferably tubular, are, at their inner ends, telescoped into and journaled within a seat formed in the lower portion of partition plate 24. Axially aligned with the agitator shafts 25 and journaled in the lower portions of the bearing plates 16 are wheel-driven hub shafts 26. These shafts 26, as shown, are tubular and are provided with diametrically reduced projections 27, shown as formed by a short shaft section rigidly secured therein by suitable means such as a pin 28 or by welding. At their outer ends, wheel-driven stub shafts 26 are shown as provided with diametrically projecting pins 29 that engage notches 30 in the wheel hubs and cause the wheels to drive the said hub shafts.

The trunnion-like projections 27 of hub shafts 26 are telescoped into the outer ends of the respective tubular shafts 25 and are connected thereto for rotation therewith by suitable detachable means such as bolts or pins 31. On the trunnions 27 are spacing washers or elements 32 that are normally engaged between the outer ends of the agitator shafts 25 and the inner faces of the bearing plates 16. These spacing washers 32 are of such width that when applied, as shown in Fig. 6, they will hold the inner ends of the agitator shafts seated in the partition plate 24. The further purpose of these spacing washers will be more fully described later on.

The agitator shafts 25 carry circumferentially spaced longitudinally extended agitating bars or rods 33. These rods, at their ends, are attached to the respective agitator shafts, but at their intermediate portions are spaced from said shaft. In Fig. 6 the ends of the agitator rods 33 are shown as secured to but spaced from the respective shafts 25 by spacing rings 34, but might be attached in any other suitable way. It is important, however, that the rods 33 be spaced from the outer surfaces of the respective shafts 25 and arranged to run in close engagement but always out of contact with the perforated bottom of the hopper. Fig. 5 shows approximately the proper spacing and by reference thereto it will be noted that there is about the same amount of spacing between the rods and agitator shafts that there is between the rods and the perforated bottom of the hopper. It will now be noted that when the supporting wheels are rotated, the agitator shafts will also be rotated.

The valve-acting gate referred to above is here indicated by the numeral 35 and, as indicated, fits against the concave bottom of the hopper, as best shown in Fig. 5. This gate 35 is provided with diamond-shaped discharge passages 36 that correspond in form and spacing to those in the bottom of the hopper and, as best shown in Fig. 8, are adapted to be moved more or less into registration with the discharge ports of said hopper or to be moved entirely out of registration therewith. Here it will be noted that the diamond-shaped passages of the hopper and gate are rounded slightly at their salient angles to avoid sharp points. The upper edge of the valve-acting gate 35 is reinforced by angle bars 37 and 38 rigidly secured thereto by rivets, spot welding, or otherwise. Rigidly secured to and depending from these angle bars 37 and 38 are transversely spaced approximately U-shaped hanger brackets 39 that support a round or cylindrical scatter bar or rod 40 preferably in the form of a metallic tube or pipe resting in the depending angles of the hanger brackets. This scatter bar or rod 40 is located directly below the discharge passages of the hopper and gate or valve-acting plate.

At its central portion, see particularly Fig. 2, the angle bar 37 is notched and provided with a hinge rod 41 that rests on or pivotally mounted in a hinge bracket 42 secured on the adjacent side of the hopper 12; and at its ends said angle bar 37 has projecting trunnions or hinge pins 43 that are pivoted in the flanges 17' of trunnions 17. Hinge rods 41 and 43 are, of course, axially aligned and they pivotally support the gate 35 at one side. To support the gate at its opposite side and hold the same closely engaged against the bottom of the hopper, I preferably employ and have shown a suspending link cable or chain 44, as best shown in Figs. 3, 5 and 7. This link, at its upper end, is shown as provided with a headed bolt 45 subject to a coiled spring 46 seated in an anchoring case 47 bolted or otherwise rigidly secured to the overlying angle iron or bar 14 at the top of the hopper. At its lower end the link forming chain 44 is shown as provided with an anchoring section 48 having a head 49. Anchoring section 48 is adapted to be engaged between projecting prongs 50 of angle bar 38 of the valve-acting gate. By the means just described, the gate will be normally held in close contact with the bottom of the hopper and the suspending link-acting cable 44 will swing and permit sliding adjustments of said gate.

Rigidly secured to the front face of the hopper 12 and reinforcing the same is a heavy flat metal bar 51 to the intermediate portion of which latter is rigidly secured lugs or brackets 52 and 53.

For shifting of the valve-acting gate 35, there is provided a shift lever 54 pivoted at 55 to the lugs 53. The lower end of this lever 54 engages between lugs 56 rigidly secured to the bar 37 of the gate 35, as best shown in Figs. 2 and 3.

Valve-acting gate 35, at one end, to wit: as shown at the left in Fig. 2, is provided with a lug or bracket 57 through which works a stop screw 58. The extended end of screw 58 is engageable with the flange 17' of the left hand trunnion 17. The important function performed by this screw 58 will be pointed out in the description of the operation, but at this point it may be stated that the said screw serves as a suitable device for limiting the extreme movement and position of the gate 35.

As best shown in Figs. 2 and 5, I provide an indicator for visually indicating the position of the gate for different degrees or extent of feeding action. This means, as shown, includes a pointer lever 59 that is pivoted at 60 to a stud 61 that is rigidly secured to and projects from the reinforcing bar 51. On the stud 61 there is shown a light coiled spring 62 that yieldingly presses the pointer 59 against its bearing on the bar 51. At its lower end pointer 59 is engaged in a notch 63 shown as cut in the upper edge of the bar 37 of gate 35. The upper end of pointer 59 works over a graduated bar or dial 64 applied on the front face of the hopper. The lower end of pointer 59 is subject to a light coiled tension spring 65 attached thereto and anchored to the flange 17'.

This machine or spreader is adapted to be pulled or pushed by any suitable means, but, as shown, it is adapted to be connected to a tractor or other vehicle and pulled forward through a draw bar 66, the rear end of which, by a bolt 67, is attached to the lugs 52 and 53 of reinforcing bar 51. The draw bar 66 is further connected to the hopper by oblique brace angles or bars 68 and a brace bar or strap 69. The outer ends of braces 68 are shown as attached to the flanges 17' of trunnions 17, and the upper end of brace 69 is shown as attached to the front angle bar 14.

Operation

The operation and use of the device above described is substantially as follows.

When the parts are assembled and adjusted, as best shown in Fig. 6, the spacing washers 32 are engaged between the outer ends of the respective agitator shafts 25 and the adjacent surface of the bearings 16 and then hold the stub shafts 26—27 and the agitator shafts 25 against axial movements, but free for rotation. When the parts are thus held against axial movement, the coupling pin 29 will be held in interlocking engagement with the wheel hubs and the inner ends of the agitator shafts will be held seated in the bearing or partition 24.

When the bolt or pin 31 is removed, the stub shafts 26—27 can be freely moved axially out of engagement with the cooperating agitator shaft and out of engagement with the spacing washer 32. When this operation is performed, the released agitator shaft 25 can be moved axially far enough to disengage its inner end from the bearing 24, thereby permitting the agitator shaft with its agitating rods 33 to drop to the bottom of the hopper or to be picked up and removed from the hopper.

It will be noted that the so-called stub shaft constitutes a part of a floating axle and while it serves to transmit motion to the agitator from the wheel hub, it does not support or form a part of the bearing for the wheel hub.

When the agitator is mounted and coupled, as shown in the drawings and particularly in Fig. 6, and the cooperating wheel is rotated, the agitator bars 11 will pass through the fertilizer, seed or other material in the hopper, keeping the same thoroughly broken up and agitated and free for discharge through the perforations of the hopper and gate. The rods 33 are spaced from the respective shafts 25 far enough so that the fertilizer, seed, or the like, will not be caught and held between the said rods and shaft, and the said rods run far enough away from the perforated bottom of the hopper so that seeds, or the like, will not be jammed or the material be packed against the bottom of the hopper.

In this improved form of the machine the two agitators are independently driven one from each wheel, and this is important for several reasons. For instance, when the machine turns a corner or travels on a curved line, the wheel and agitator on the outer side of the curve will be driven faster than the wheel and agitator that are on the inner side of the curve. Thus with this improved machine, more fertilizer or a greater amount of seed will be discharged on the outer side of the curve than on the inner side of the curve and this, of course, is desirable because it gives more nearly a uniform deposit of materials per foot of travel or ground covered in the discharging operation.

The substantially diamond-shape form of ports or passages in the bottom of the hopper and in the gate or perforated sliding plate gives the very best kind of adjustment for varying discharge of materials. When the diamond-shape perforations of the said hopper and gate are in complete alignment, a maximum rate of discharge will be provided for, but as the gate is adjusted to decrease the overlapping engagement of the perforations thereof with the perforations in the bottom of the hopper, the discharging action will be progressively decreased. When the said perforations are overlapped only slightly, small, nearly round, openings will be afforded for the discharge of the materials and, of course, when the perforations are entirely out of lapping engagement, there will be no discharge whatever of the materials. Figure 8 shows the perforations or passages about one-half overlapped. Of course, the adjustment for various overlapping of the perforations or passages will be regulated according to the rate of discharge of materials required and to the character of the material itself. Obviously finely pulverized materials such as pulverized fertilizer and fine seeds will require less overlapping of the diamond-shape perforations than would be required for coarser materials.

The materials dropped through the perforations or discharge passages of the hopper and gate will fall on to the bar 40 and will be deflected and scattered thereby. Thus the small streams discharged from the perforations will be broken up and scattered and commingled and evenly distributed on the ground. In practice it has been found important that this scatter bar 40 be rounded or cylindrical. A sharp edged scatter bar would simply tend to divide the falling stream of materials, but this round or cylindrical bar affords a surface onto which the materials will be dropped and deflected; and, moreover, this form of scatter bar will intercept the streams of falling materials regardless of whether the machine is being driven upward or downward on an incline.

As already clearly described, the concave gate will be quite firmly drawn against the bottom of the hopper under the tension of the spring retracted link-acting element 44, but the latter will permit the sliding movements of the gate required for the regulation of the discharge of the materials.

The adjustments of the gate, as previously noted, may be readily accomplished by adjustments of the lever 54. When lever 54 is moved to adjust the gate, the pointer or indicator lever 59 will indicate on the dial 64 the extent of the gate adjustment. In Figure 2 the gate is shown as adjusted for a predetermined discharge of the materials with the perforations of the gate and hopper overlapped substantially as shown in Fig. 8. Assuming that the adjustment just noted is that required, then the stop screw 58 may be adjusted so as to limit the closing movement of the gate to the position just indicated. If adjustments of the gate for a faster discharging action is required, then the gate would have to be moved further toward the right in respect to Fig. 2; but if slower feed action is required, then screw 58 should be screwed back in lug 57 so as to set the gate more nearly to a port closing position. There will be considerable frictional engagement between the gate and the bottom of the hopper, and that friction will serve to hold the gate against accidental sliding movement; but the stop device 58 is desirable as a means for determining the exact position in which the gate is set for a predetermined desired feeding action. In setting the gate for accurate predetermined feeding action, it is desirable to move the upper end of lever 54 first toward the left, thereby shifting the gate toward the right in respect to Fig. 2 and thereafter to shift the upper end of lever 54 toward the right and thereby move the gate toward the left as far as permitted by the stop 58, thereby taking up the slack or loose play that might be between the lever and the gate.

While the major use of the machine will probably be for the broadcasting or even distribution of fertilizer, seeds and dry chemicals, it will be found highly serviceable for the broadcasting or spreading of sand, for example, over icy streets and sidewalks. For all of such purposes the machine will be found accurate and reliable and easily operated, adjusted and cleaned.

While I have, in accordance with the statutes, disclosed a preferred or commercial form of my improved machine and have suggested certain modifications or variations thereof, it will be understood that various other modifications or adaptations of the machine may be made all within the scope of the generic invention herein disclosed and defined in the claims.

What I claim is:

1. In a device of the kind described, a hopper, laterally spaced wheels supporting said hopper, a rotary agitator mounted in said hopper and having a shaft axially aligned with one of said hopper-supporting wheels, a primary drive shaft connected to rotate with and to move axially of the hub of the aligned wheel, said drive shaft and the shaft of said agitator having telescopic engagement, means for locking said drive shaft to said agitator shaft for common rotation, said hopper having a bearing with which the extended end of said agitator shaft is telescopically and rotatively engaged but from which it may be disengaged by a limited axial movement, said rotor shaft being of such length that it will drop within the hopper when withdrawn from said inner bearing, and displaceable means normally holding said agitator shaft against such release and dropping movement.

2. A hopper having outside and intermediate bearings and outwardly projecting tubular wheel-supporting trunnions, wheels journaled on said trunnions, rotary agitators having independent tubular shafts, the inner ends of which are telescopically engaged in said intermediate bearing, said agitator shafts being of such length that when they are axially moved to disengage said inner ends, they will independently drop within the hopper compartments, primary drive shafts extended through said wheel-supporting trunnions and detachably connected to the wheel hubs for rotation therewith, said drive shafts having inner ends telescoped into and rotatively locked to the respective tubular agitator shafts, and spacing devices interposed between the respective outside bearings and the adjacent ends of said agitator shafts, said spacing devices being of such axial width that when applied they will hold the respective agitator shafts against axial movements with their inner ends engaged with the said intermediate bearing, but when removed, will permit said agitator shafts to move axially and drop within the respective hopper compartments.

3. In a machine of the kind described, a hopper having longitudinally spaced delivery perforations in its bottom, a valve-acting gate plate normally engaging the bottom of the hopper and having perforations spaced to correspond to the spaced perforations in the hopper bottom, said perforated gate plate being hingedly anchored to one side thereof on an axis extending longitudinally of the hopper for pivotal movements to and from an operative position against the bottom of the hopper, said hinge connection of the gate plate being made through the medium of a hinge connection permitting limited longitudinal sliding movement of the gate plate for the purpose of regulating the rate of flow through the cooperating perforations of the gate plate and hopper bottom.

4. The structure defined in claim 3, in which the hopper bottom and gate plate are concave.

5. The structure defined in claim 3, in which the longitudinally slidable hinged gate plate is normally held in engagement with the bottom of the hopper by a depending swinging link that is anchored with respect to the hopper at its upper end and to the other side of the hinged gate plate at its lower end.

6. The structure defined in claim 3 in further combination with a cross-sectionally round scatter bar extending longitudinally of the hopper in spaced relation to the bottom thereof, said scatter bar being located directly below the delivery perforations in the gate plate and being supported from the gate plate by spaced V-shaped hanger brackets which are anchored at their upper ends to opposite sides of the gate plate and to the scatter bar at their lower portion.

7. The structure defined in claim 3 in further combination with an actuating lever pivotally anchored intermediate its ends for swinging movements with respect to and in a plane extending longitudinally of the hopper, and spaced lugs on the hopper and between which one end portion of said lever operates.

8. In a device of the kind described, a hopper having discharge passages in its bottom, laterally spaced wheels journaled to and supporting said hopper, axially aligned independently rotatable agitators in said hopper each connected to and rotatable only by the wheel that is at the same side of the hopper, the connection between each agitator and its driving wheel comprising a stub shaft connected to rotate with the respective wheel and having detachable driving engagement with the agitator, said stub shaft having telescopic detachable connection with this cooperating agitator, said hopper having an intermediate bearing into which the ends of said agitators are normally telescoped, and stop washers on the stub shaft normally interposed between the outer ends of said agitators and the adjacent outer walls of the hopper.

EBENHARD S. GANDRUD.